United States Patent [19]

Nussmeier

[11] 4,355,899

[45] Oct. 26, 1982

[54] INTERFEROMETRIC DISTANCE MEASUREMENT METHOD

[75] Inventor: Thomas A. Nussmeier, Thousand Oaks, Calif.

[73] Assignee: The United States of America as represented by the Secretary of the Air Force, Washington, D.C.

[21] Appl. No.: 152,232

[22] Filed: May 22, 1980

[51] Int. Cl.³ .................................................. G01B 9/02
[52] U.S. Cl. ...................................... 356/349; 356/358
[58] Field of Search ................................. 356/349, 358

[56] References Cited

U.S. PATENT DOCUMENTS

| | | | |
|---|---|---|---|
| 3,171,881 | 3/1965 | Morokama | 356/352 |
| 3,398,287 | 8/1968 | Krogstad et al. | 250/220 |
| 3,523,735 | 8/1970 | Taylor | 356/349 |
| 3,572,935 | 3/1971 | Howell et al. | 356/358 |

OTHER PUBLICATIONS

Pamphlet entitled "Geodolite, Laser Distance-Measuring Instrument", Spectra-Physics, Inc.
Pamphlet entitled "Civil Engineering/Surveying Equipment, General Information", Hewlett-Packard.
Pamphlet entitled "AGA Model 6 Geodimeter", AGA Corp.
Pamphlet entitled "AGA Geodimeter, Model 4D", AGA Corp.

Primary Examiner—John K. Corbin
Assistant Examiner—Matthew W. Koren
Attorney, Agent, or Firm—Donald J. Singer; Jacob N. Erlich

[57] ABSTRACT

An interferometric distance measurement method which utilizes a sequence of at least two closely spaced optical wavelengths in order to achieve ambiguity resolution during the measurement procedure. In so doing, this method performs the equivalent of measuring distances at a relatively long wavelength by measuring the phase difference at two closely spaced optical wavelengths and computing the effective phase measurement at a wavelength which corresponds to the frequency difference between the two optical wavelengths measured.

6 Claims, 1 Drawing Figure

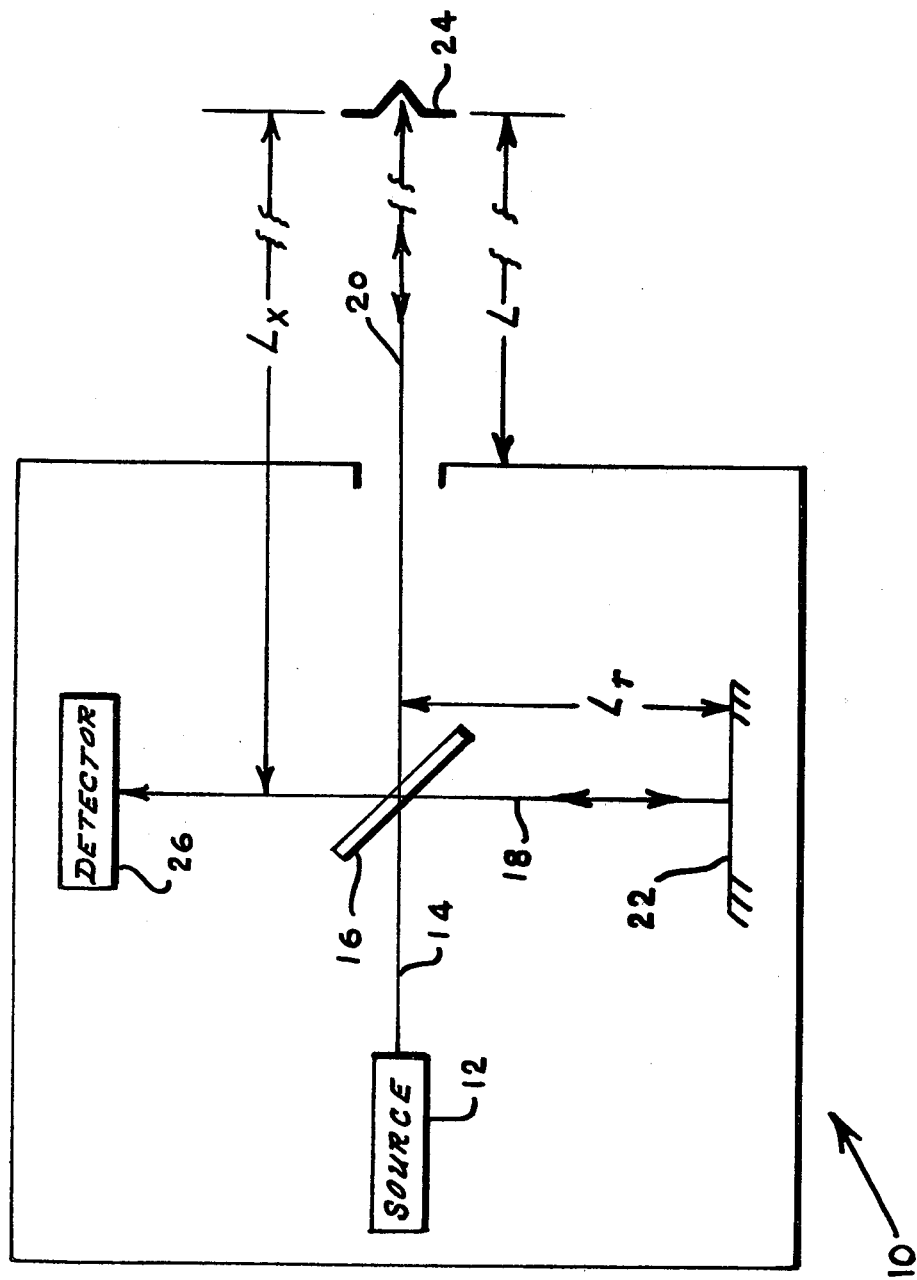

INTERFEROMETRIC DISTANCE MEASUREMENT METHOD

STATEMENT OF GOVERNMENT INTEREST

The invention described herein may be manufactured and used by or for the Government for governmental purposes without the payment of any royalty thereon.

BACKGROUND OF THE INVENTION

This invention relates generally to distance measurement techniques, and, more particularly to an interferometric distance measurement method for optically measuring distance over relatively long paths with resolution to a small fraction of an optical wavelength, but without the range ambiguity inherent in conventional interferometry.

In today's highly industrialized and highly technological society it becomes more and more essential to provide devices and/or techniques capable of measuring distances over relatively long paths. Such a case would be, for example, in the alignment of large telescopes constructed from small subapertures wherein accuracies of less than 0.1 μm over ranges of up to 50 meters are required. There are several conventional techniques which are utilized in making such distance measurements, however, most of these techniques combine the utilization of both interferometry and geodimetry. Such systems, therefore, utilize complex hardware made up of modulators, phase detectors, phase matched amplifiers, etc.

In relying on interferometry as a technique for distance measurement it is generally necessary to measure the distance between an unknown path and a reference path in which an ambiguity factor must be resolved in achieving these measurements. Heretofore, ambiguity resolution was achieved by making a plurality of measurements at increasingly longer wavelengths. For example, if the first measurement was made using a wavelength of 1 μm, a second measurement might be made at 100 μm, and a third measurement at 10 cm etc., with each successive measurement used to resolve the ambiguity in the previous measurement wherein the actual choice of wavelengths is a function of the precision that is achieved in the phase measurement process. Unfortunately, it is extremely inconvenient to make measurements at all of these wavelengths, since each regime requies different techniques and different equipment. In addition, operation at longer wavelengths (as set forth hereinabove) makes beam confinement more difficult.

To overcome these problems many techniques of the past have utilized a subcarrier technique, where the longer wavelength signal is used to modulate an optical carrier which is propagated over the path. In such a technique, a lower frequency modulation is placed on the optical or other carrier beams transmitted over the unknown path to a reflector and back, demodulated to recover the modulation, and then compared in phase to the modulating signal. The phase difference would be a function of the path delay which is proportional to the path length.

As clearly set forth hereinabove, it is quite apparent that the devices and techniques of the past leave much to be desired in the precise measurement of distance over relatively long paths. Therefore, an interferometric measurement method capable of overcoming the above-mentioned problems is highly desirable.

SUMMARY OF THE INVENTION

The instant invention overcomes the problems encountered in the past by providing an interferometric distance measurement method utilizing a single instrument and which is capable of optically measuring distance over relatively long paths with resolution of up to a small fraction of an optical wavelength. Consequently, this invention eliminates equipment necessary to generate the subcarriers, modulate the carrier and demodulate the received signals.

The interferometric distance measurement method of this invention performs the equivalent of measuring distances at a relatively long wavelength (as in the past) by measuring the phase difference at two closely spaced optical wavelengths and computing the effective phase measurement at a wavelength which corresponds to the frequency difference between the two optical wavelengths measured. In general, an approximate distance measurement can be performed by any of the prior instruments for distance measurement. The accurate measurement, however, is performed by the method of this invention wherein the determination of range or distance requires the measurement of optical paths or phase differences between two paths, a reference or known path and an unknown path. This phase difference can be measured by any conventional interferometer utilized within the system of this invention.

With this invention any suitable source of electromagnetic radiation, in the optical wavelength region is utilized to provide a beam which can be directed to a reflective element located at the unknown distance, $L_x$, and to a reflective element at a known distance, $L_r$. The phase difference between the receipt of these two signals can be detected by any conventional interferometer. The distance which is measured by this invention, L, is the difference $L_x-L_r$. By utilizing the formula $2L=N\lambda+l$ where N is the integer number of wavelengths in the path 2L, $\lambda$ is the wavelength, l is the residual fractional wavelength of the distance 2L and wherein $l=\phi\lambda/2\pi$ where $\phi$ is the optical phase difference of a beam directed between distances $L_x$ and $L_r$; the distance L can be determined. This determination is made by a series of measurements at closely spaced optical frequencies or wavelengths. In so doing, the necessity of subcarrier technique is eliminated.

It is therefore an object of this invention to provide an interferometric distance measurement method which is extremely accurate over relatively long paths.

It is another object of this invention to provide an interferometric distance measurement method which is substantially more simplified than techniques heretofore in use.

It is a further object of this invention to provide an interferometric distance measurement method which is capable of using only a single instrument and repetitive measurements using only closely spaced optical wavelengths.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

The only FIGURE of the drawing is a schematic representation of the interferometric distance measurement method of this invention.

DETAILED DESCRIPTION OF THE PREFERRED METHOD OF THE INVENTION

Reference is now made to the only FIGURE of the drawing which schematically illustrates the interferometric distance measurement instrument 10 utilized in the performance of the distance measurement method or technique of this invention. Measurement instrument 10 incorporates therein any conventional source of electromagentic radiation 12, preferably in the form of a laser emitting a beam 14 in the optical wavelength region. Also forming part of instrument 10 is any conventional beam dividing device such as beam splitter 16 capable of dividing beam 14 into two portions, hereinafter referred to as beams 18 and 20. Beam 18 is directed a known distance, $L_r$, away from beam splitter 16 to any suitable reflective element 22 in the form of a mirror. Beam 20 is directed an unknown distance, $L_x$, away from beam splitter 16 to another reflective element 24 in the form of another mirror.

Upon striking reflective elements 22 and 24, respectively, beams 18 and 20 are reflected therefrom and are received by any conventional detector 26 capable of measuring the phase difference, $\phi$, between beams 18 and 20. Detector 26 may be in the form of a conventional interferometer, for example. Since the components making up the interferometric distance measurement instrument 10 utilized with the method of this invention are conventional, the detailed description set forth hereinbelow will describe with specificity only the method of this invention.

As pointed out hereinabove the unknown distance is depicted as $L_x$, however, for purposes of convenience and ease of understanding of this invention the distance that will be measured by this invention will be hereinafter referred to as, L, the difference between the unknown distance $L_x$ and the known distance $L_r$ (i.e., $L=L_x-L_r$). Since the distance L is travelled in two directions the more common expression $2L=N\lambda+1$ will be the basic expression utilized with the method of this invention. In this expression, N = the integer number of wavelengths in distance 2L, $\lambda$ = the wavelength of beam 14 and l = the residual wavelength in distance 2L.

In the past, resolution of the ambiguity or residual wavelength in the distance l was achieved by a plurality of measurements made at increasingly larger wavelengths. Such a procedure was extremely inconvenient since it required a plurality of techniques and different instruments at different wavelengths. For example, the wavelengths generally ranged between the optical and the radiowave. The method of the instant invention overcomes this problem, not by the subcarrier technique described hereinabove, but by a method wherein measurements are made at closely space optical wavelengths with a single instrument. Such a procedure, as set forth in detail hereinbelow, is the equivalent of making measurements at relatively long wavelengths by measuring the phase difference of at least two closely spaced optical wavelengths and computing the effective phase measurement at a wavelength which corresponds to the frequency difference between the two optical frequencies measured.

More specifically, and still referring to the only FIGURE of the drawing a first beam of electromagnetic radiation having an optical wavelength $\lambda_1$ is emitted by laser 12. Consequently, the general expression for 2L set forth hereinabove can be rewritten as $$2L = N_1\lambda_1 + l_1 \text{ where } l_1 = \phi_1\lambda_1/2\pi \tag{1}$$

for the first beam.

In equation (1) there are two unknown quantities, L and $N_1$ and therefore additional information is necessary to solve this equation. To obtain this additional information, a second beam is emitted by laser 12 having an optical wavelength $\lambda_2$ closely spaced to the optical wavelength of the first beam. Therefore, $$2L = N_2\lambda_2 + l_2 \text{ where } l_2 = \phi_2\lambda_2/2\pi \tag{2}$$

for the second beam.

Proceeding mathematically $$2L = N_1\lambda_1 + l_1 = N_2\lambda_2 + l_2 \tag{3}$$

Since these are independent measurements, there are two independent measured quantities ($l_1$ and $l_2$) and three unknowns L, $N_1$ and $N_2$. In order to solve this equation, the second wavelength $\lambda_2$ must be established. To do so, an assumption must be made that $N_1 = N_2$, that is, the integer number of wavelengths at the two closely spaced optical wavelengths $\lambda_1$ and $\lambda_2$ will be equal. Under this assumption (from equation 3).

$$N_1 = N_2 = N = (l_1 - l_2)/(\lambda_2 - \lambda_1) \tag{4}$$

The range of measurement instrument 10 would again become ambiguous when the term $N_1 = N_2 + 1$ (where $\lambda_1$ = the shortest wavelength). At the exact point of unambiguity, $l_1 = l_2 = 0$. Consequently, at the point wherein $l_1 = l_2 = 0$, the unambiguous range of the two-wavelength combination is $$2L_u = N_1\lambda_1 = (N_1 - 1)\lambda_2 \tag{5}$$

$$\text{or, } 2L_u = N_1\lambda_1 \tag{6}$$

$$\text{or, } N_1\lambda_1 = (N_1 - 1)\lambda_2 \tag{7}$$

Rearranging equation (7)

$$N_1\lambda_2 - N_1\lambda_1 = \lambda_2 \tag{8}$$

$$\text{or, } N_1 = \lambda_2/(\lambda_2 - \lambda_1) \tag{9}$$

Substituting equation (9) into equation (6) gives $$2L_u = (\lambda_2/(\lambda_2 - \lambda_1))\lambda_1 = (\lambda_2\lambda_1)/(\lambda_2 - \lambda_1) \tag{10}$$

The relationship between wavelength and frequency is $\lambda = c/f$ where c = speed of ligh and f = frequency. (11)

Substituting equation (11) into equation (10)

$$2L_u = \lambda_2\lambda_1/(\lambda_2 - \lambda_1) = (c/f_2)(c/f_1)/((c/f_2)-(c/f_1)) = (c^2/f_2f_1)/c((f_1-f_2)/f_2f_1) \tag{12}$$

$$\text{or, } 2L_u = c/(f_1 - f_2) \tag{13}$$

Consequently, knowing the unambiguous region of instrument 10 and $f_1$; $f_2$, that is, $\lambda_2$ can be determined from equation (13).

In principle, $\lambda_1$ and $\lambda_2$ may be selected to achieve any desired unambiguous range. In practice, however, the maximum range is set by the accuracy to which the wavelengths are known and to which the phase may be measured.

If the expression for $N_1$ from equation (4) is now substituted into equation (3)

$$2L = ((l_1 - l_2)/(\lambda_2 - \lambda_1))\lambda_1 + l_1 \quad (14)$$

Since $l_1 = \phi_1\lambda_1/2\pi$ and $l_2 = \phi_2\lambda_2/2\pi$, the values for $l_1$ and $l_2$ can be substituted in equation (14) and after rearranging, $$2L = ((\phi_1 - \phi_2)/2\pi)(\lambda_1\lambda_2/(\lambda_2 - \lambda_1)) \quad (15)$$

$$\text{or, } 2L = (\phi_1\phi_2/2\pi)(c/(f_1 - f_2)) \quad (16)$$

wherein equation (16) represents a phase measurement at the wavelength of the difference frequency.

EXAMPLE OF THE METHOD OF THE INVENTION

With the method of this invention it is first necessary to establish the maximum distance (i.e., the unambiguous range, $L_u$) instrument 10 is to measure. Let us assume this to be 5 m, thus twice that distance $2L_u = 10$ m. Let us also assume instrument 10 is to operate at 10.0 μm, an infrared wavelength corresponding to the $CO_2$ laser. We will therefore assume an accuracy of measurement of better than 1:1000, and, in fact it is possible to measure to an accuracy of ±3:10,000.

It should further be realized that all references to distance in the following discussion are related to 2L. Therefore, the result achieved by the method of this invention would represent 2L and would have to be divided by 2 to get the distance L which could then be substituted in the equation $L = L_x - L_r$ to get unknown distance $L_x$.

Let us choose our first measurement at wavelength $\lambda_1$ at exactly 10.0 μm, represented by the frequency $f_1 = 3 \times 10^{13}$. Since it has been established hereinabove that $2L_u = 10.0$ m, equation (13) can be utilized to compute frequency $f_2$ or the second measurement wavelength $\lambda_2$. Frequency $f_2$ computes to be $2.99999 \times 10^{13}$ or a wavelength of 10.000001 μm.

Measurements of phase difference $\phi_1$ and $\phi_2$ are now made with instrument 10 at the above two wavelength $\lambda_1$ and $\lambda_2$. A calculation of distance using equation (16) will yield 2L = 6.714, for example. Since there is an uncertainty of 3 parts in 10,000 corresponding to 0.003 meters, we know the actual distance (2L) is between 6.711 and 6.717 meters.

We will now make a measurement with an ambiguity range of 0.01 m or 10 mm. To do this we again use equation (13) and set $2L_u = 0.01$ m. Using the original $f_1 = 3 \times 10^{13}$, we compute a new $f_2$ or $\lambda_2$ but for purposes of clarity we will call the new frequency $f_3$. Frequency $f_3 = 2.997 \times 10^{13}$ corresponding to a third wavelength $\lambda_3 = 10.01001$ m. Measurements are now taken of the phase difference at $f_3$ or $\lambda_3$ and the distance 2L from equation (16) is calculated at 0.005216 meters (5.216 mm). It is to be recalled that since we assumed $N_1 = N_2$ the maximum range we can measure with these frequencies is 0.01 m, and the result must be less than 0.01 m.

Since we picked a convenient value of 0.01 m for our ambiguous range, this really means that each time the range increases by 0.01 m, $N_2$ becomes larger than $N_1$ by another count. Thus we know that the range can be 0.005216 meters, 0.015216 meters, 0.025216 meters, etc. If we extend this series of possible ranges, we will eventually realize that the range can be 6.705216, 6.715216, 6.725216, 6.735216, etc. as $N_1$ and $N_2$ diverge by ever increasing amounts. Since we already know (from our first two measurements) that the distance is between 6.711 and 6.717 m, we immediately know that the range must be 5.715216 meters, since this is the only possible value that falls in this range. We have used our first measurement to resolve the ambiguity in our second measurement.

Of course, our second set of measurements has an uncertainty too. Since we are now measuring at 0.01 m, our uncertainty of 3 parts in 10,000 means that we have a possible error of 0.000003 m, thus our range is known to lie in the region between 6.715213 and 6.715219 m. We can now make a measurement at 10 μm, which is our optical wavelength. Since we are measuring directly at $f_1$, a second frequency is unnecessary.

Assume that this measurement at $f_1$ results in a range of 0.000008125 m (8.125 μm). As set forth above, we known that the range can be any multiple of 10 μm + 8.125 μm, thus the values 6.715208125, 6.715218125, 6.715228125, etc., are all valid values for this last measurement. Again, from our previous measurements, we know that the range must be 6.715218125, since the other two are outside our previously established range limits. Of course, we still have our uncertainty in this last measurement, which is 0.000000003 m, thus we have again bracketed our range as somewhere between 6.715218122 and 6.715218128 m.

If we need even more accuracy, it is necessary to go to shorter wavelengths. To do this, we must select a different optical region for instrument 10. For instance, we may decide to work at 1 μm instead of 10. This, of course, will mean a whole new set of frequencies calculated from equation (13), and may mean we need to make more than three steps. However, the principle remains the same. In fact, the original selection of operating wavelength is determined by the ultimate accuracy required in the measurements, and is an engineering choice to be made when instrument 10 is designed.

Although this invention has been described with reference to a particular method, it will be understood to those skilled in the art that this invention is also capable of a variety of alternate methods within the scope and spirit of the appended claims.

I claim:

1. A method for determining the distance between a first preselected point and a second point comprising the steps of:
   (a) providing a first beam of electromagnetic radiation at a first optical wavelength;
   (b) splitting said first beam at said first preselected point into a beam following a first path and a beam following a second path, said first path beam being focused onto a first reflective surface a known distance from said preselected point, said known distance being defined as $L_r$, said second path beam being focused onto a reflective surface at said second point an unknown distance from said preselected point, said unknown distance being defined as $L_x$;
   (c) defining $L_x - L_r = L$ and $2L = N_1\lambda_1 + l_1$; wherein $N_1$ = the integer number of wavelengths in said 2L; $\lambda_1$ = said first wavelength; and $l_1$ = the residual fractional wavelength in said distance 2L and wherein $l_1 = \phi_1\lambda_1/2\pi$ where $\phi_1$ = the optical phase difference of said first beam between $L_x$ and $L_r$ at said first wavelength;
   (d) determining the optical phase difference, $\phi_1$;

(e) replacing said first beam with at least a second beam of electromagnetic radiation at a second optical wavelength, said second beam following the same optical path as said first beam such that said second beam is split into a beam following said first path and a beam following said second path, said first path beam of said second beam being focused onto said first reflective surface said known distance from said preselected point, said known distance being defined as $L_r$, said second path beam of said second beam being focused onto said reflective surface at said second point an unknown distance from said preselected point, said unknown distance being defined as $L_x$;

(f) defining $L_x - L_r = L$ and $2L = N_2\lambda_2 + l_2$; wherein $N_2 =$ the integer number of wavelengths in said 2L; $\lambda_2 =$ said second wavelength and $l_2 =$ the residual fractional wavelength of said distance 2L and wherein $l_2 = \phi_2\lambda_2/2\pi$ where $\phi_2 =$ the optical phase difference of said second beam between $L_x$ and $L_r$ at said second wavelength;

(g) selecting said second wavelength, $\lambda_2$, at a wavelength different than said first wavelength but closely spaced thereto such that $N_1 = N_2$;

(h) determining the optical phase difference $\phi_2$, (i) utilizing the determined $\phi_1$ and $\phi_2$ in order to determine $l_1$ and $l_2$ from the relationships $l_1 = \phi_1\lambda_1/2\pi$ and $l_2 = \phi_2\lambda_2/2\pi$, respectively;

(j) determining the integer number of wavelengths, $N_1$, in 2L by inserting the previously determined $l_1$ and $l_2$ in the equation $$N_1 = N_2 = (l_1 - l_2)/(\lambda_2 - \lambda_1);$$

(k) determining L by inserting the determined N in the equation $L = (N_1\lambda_1 + l_1)/2$;

(l) determining said unknown distance, $L_x$, by inserting L determined in step (k) in the equation $L_x = L - L_r$.

2. A method for determining the distance between a first preselected point and a second point as defined in claim 1 wherein said first and said second beams of electromagnetic radiation are provided by a laser.

3. A method for determining the distance between a first preselected point and a second point as defined in claim 2 wherein said optical phase differences $\phi_1$ and $\phi_2$ are determined by an interferometer.

4. A method for determining the distance between a first preselected point and a second point as defined in claim 1 wherein range determining means are provided for producing said first and said second beams of electromagnetic radiation and determining said phase differences $\phi_1$ and $\phi_2$, said range finding means having a preselected unambiguous range.

5. A method for determining the distance between a first preselected point and a second point as defined in claim 4 wherein said preselected unambiguous range is defined as $L_u$ and said second wavelength can be determined by the equation $2L_u = c/(f_1 - f_2)$ wherein $c =$ the speed of light and $f_1 = c/\lambda_1$ and $f_2 = c/\lambda_2$.

6. A method for determining the distance between a first preselected point and a second point comprising the steps of:

(a) providing a first beam of electromagnetic radiation at a first optical wavelength;

(b) splitting said first beam at said first preselected point into a beam following a first path and a beam following a second path, said first path beam being focused onto a first reflective surface a known distance from said preselected point, said second path beam being focused onto a reflective surface at said second point an unknown distance from said preselected point;

(c) determining an optical phase difference of said first beam as said first beam traverses said first path said known distance from said preselected point and said second path said unknown distance from said preselected point;

(d) replacing said first beam with at least a second beam of electromagnetic radiation at a second optical wavelength, said second beam following the same optical path as said first beam such that said second beam is split into a beam following said first path and a beam following said second path, said first path beam of said second beam being focused onto said first reflective surface said known distance from said preselected point, said second path beam of said second beam being focused onto said reflective surface at said second point said unknown distance from said preselected point;

(e) selecting said second wavelength at a wavelength different than said first wavelength but closely spaced thereto such that a number of whole wavelengths in the path difference between said unknown distance and said known distance is the same for both said first and said second wavelengths;

(f) determining the optical phase difference of said second beam as said second beam traverses said first path said known distance from said preselected point and said second path said unknown distance from said preselected point;

(g) utilizing said optical phase difference of said first beam, said optical phase difference of said second beam, said first wavelength and said second wavelength to establish said number of whole wavelengths in said path difference between said unknown distance and said known distance;

(h) combining said number of whole wavelengths with said optical phase difference of said first beam and said first wavelength in order to establish said path difference between said unknown distance and said known distance; and (i) determining said unknown distance between said first preselected point and said second point by combining said known distance with said path difference between said unknown distance and said known distance.

* * * * *